Sept. 26, 1944.  M. P. BLOMBERG  2,359,081
BRAKE RIGGING
Filed April 28, 1943
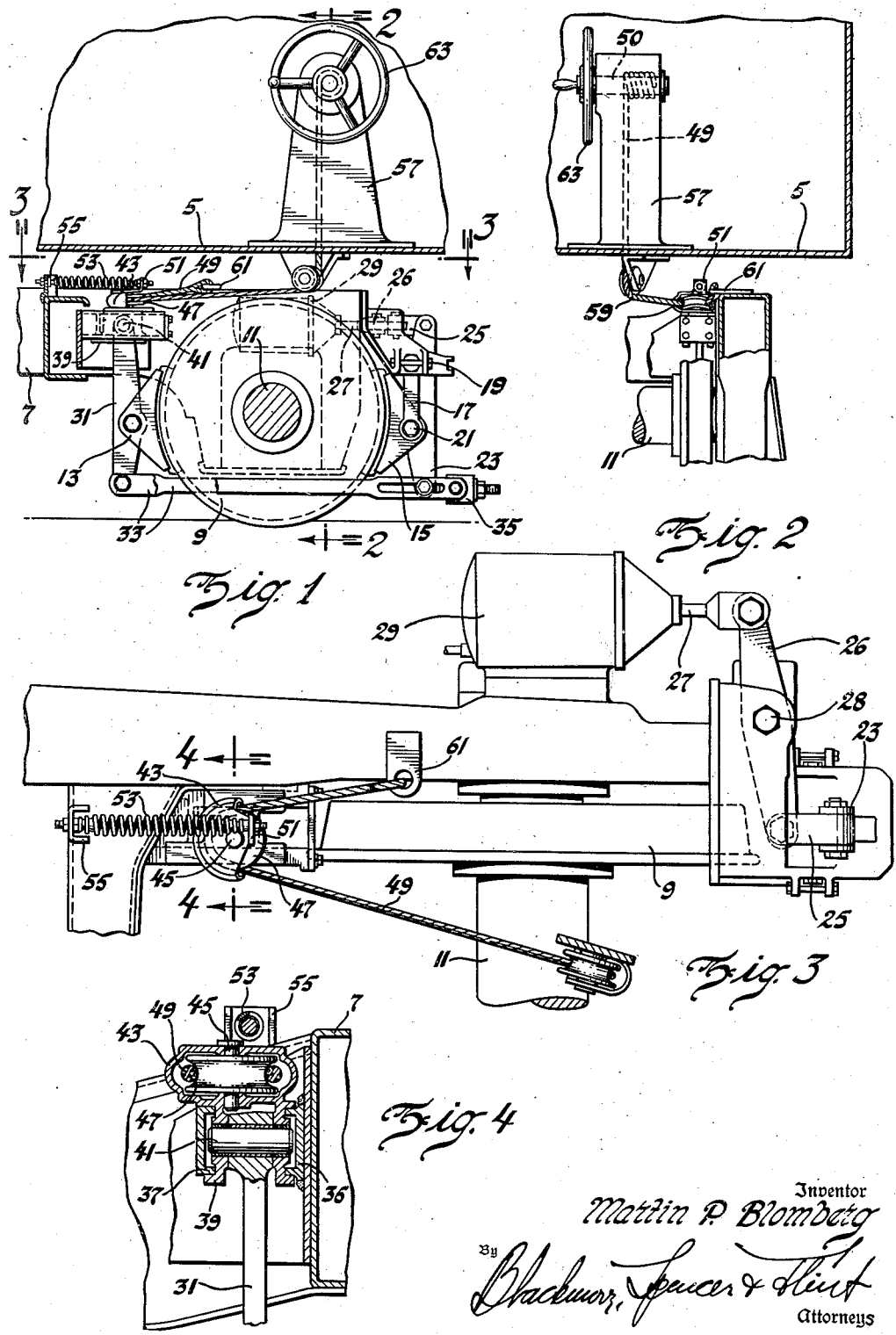
Inventor
Martin P. Blomberg
By Blackmore, Spencer & Flint
Attorneys Patented Sept. 26, 1944

2,359,081

UNITED STATES PATENT OFFICE 2,359,081

BRAKE RIGGING

Martin P. Blomberg, Hinsdale, Ill., assignor to General Motors Corporation, Detroit, Mich., a corporation of Delaware Application April 28, 1943, Serial No. 484,807

6 Claims. (Cl. 188—107)

The problem which led to this invention was to provide for manual operation of a substantially conventional power operated brake rigging as used on railway vehicles.

The object is to provide for operating by hand, and preferably from within a superposed locomotive body substantially conventional power operated brake rigging wherein only slight changes are made in said brake rigging.

Other objects and advantages will be understood from the description which follows:

On the drawing, Fig. 1 is a view in longitudinal section showing in elevation a part of a vehicle with which the invention is used.

Fig. 2 is a view in vertical section as seen from line 2—2 of Fig. 1.

Fig. 3 is a plan view as seen from line 3—3 on Fig. 1.

Fig. 4 is a section, the section line and arrow appearing on Fig. 3.

The body of a locomotive, a part 5 only of which is shown on Fig. 1, is mounted on a truck frame 7. The frame is supported as usual by wheels one of which 9 and its axle 11 are to be seen on the drawing.

The brakes for the wheels are substantially conventional. Associated with wheel 9, which may be illustrative of all, are shoe carrying brake heads 13 and 15 adapted to frictionally engage the wheel tread. Brake head 15 is hung from the truck frame by a hanger 17 pivoted to the frame at 19 and to the head at 21. Also pivotally supported at 21 is a live truck lever 23. Its upper end is shackled at 25 (see Fig. 3) to the end of a horizontal lever 26 pivoted at an intermediate point 28 to the frame or otherwise supported for rocking about its pivot. The piston rod 27 of an air brake cylinder 29 is connected to lever 26 as shown. On the other side of the wheel is a second truck lever 31. At an intermediate point it is pivoted to brake head 13. The lower ends of levers 23 and 31 are connected by two rods such as 33 straddling the wheel, provision for adjusting being seen at 35. A hanger like 17 may be used with head 13 if desired.

If the arrangement were of the conventional type the upper end of lever 31 would be mounted on a fixed pivot. With that arrangement the movement of piston rod 27 would apply the two shoes equally through the aid of the connecting bars 33. The departure from the conventional about to be described is to permit an application of the brake manually and preferably from within the vehicle without interfering with the normal service air pressure application.

A bracket 36 is mounted in any convenient manner on the truck frame 7. By means of upper and lower flanges 37 it slidably supports a block 39 carrying the pivot 41 supporting the upper end of lever 31. The block 39 is formed with a housing 43 within which is mounted on pivot axis 45 a pulley 47. The housing keeps the cable 49 from dropping from the pulley and is open for a part of its circumference for the passage of the cable. Above the housing there is secured an arm 51 for anchoring the end of a spring 53. The other end of spring 53 is anchored between the arms of a member 55 secured to the truck frame. This spring biases the block to that end of its range of travel remote from the wheel. In the air pressure application of the brake the upper end of lever 31 is similarly subjected to a pressure in the same direction with the result that the pivot 41 may be considered as fixed for the purpose of air brake operation as it normally is when the improvement of this invention is not used. It is preferred to use spring 53 but it could be omitted if desired.

Supported on the floor of the vehicle body is an upright stand 57 rotatably supporting the winding shaft 50 for the cable 49 and to which one end of the cable is secured. The cable may extend through the stand, having its direction changed by a pulley 59. It then passes on to and around the pulley 47. From the pulley 47 the cable extends to a fixed end anchorage 61 as shown. Numeral 63 refers to a hand wheel for wrapping the cable upon the winding shaft. Any known holding and releasing means may be used with wheel 63. Since the other end of the cable is fixedly anchored, rotation of the wheel 63 will reciprocate the block 39 and apply the shoes equally, the point 25 serving now as a fixed anchorage. If one does not wish to take advantage of a movable pulley the cable end could be connected directly to the end of lever 31.

It will be understood therefore that the operation of the air brake is in no way interfered with since, when the mechanical brake operation originating at wheel 63 is not used, the fulcrum of lever 31 may be thought of as fixed as it is in the conventional arrangement. In a similar way when the hand brake is used and the pivot point between lever 23 and lever 26 is not moved the action is in all respects like that of conventional brake action.

I claim:

1. Brake means for a vehicle wheel comprising shoes adapted to frictionally engage opposite sides of said wheel, first and second levers pivoted to said shoes, a rod connecting one pair of ends of said levers, a power cylinder and piston rod, said piston rod being operably connected to the second end of the first lever, yielding means to position the second end of said second lever in a position whereby it serves as an anchor for brake application by said power cylinder, and manually operable means to move said second end of said second lever against the action of said spring, with the connection of the first lever with the said operable connection associated with the piston rod serving as an anchor.

2. In a vehicle, a truck frame, a wheel, brake shoes adapted to frictionally engage opposite sides of said wheel, first and second levers pivoted to said shoes, rods connecting one pair of ends of said levers, a brake operating power cylinder and piston rod, said piston rod being connected to the second end of the first lever, a block slidable on said frame and pivotally supporting the second end of said second lever, yielding means to hold said block at an end of its movement whereby the second end of the second lever becomes an anchor for brake application by the power cylinder and other means for moving said block against the action of said spring to apply the brake independently of said power cylinder.

3. The invention defined by claim 2, said other means being a pulley carried by said block, a cable passing over said pulley, a fixed anchor for one end of said cable and manually operable means to draw on the other end of said cable.

4. The invention defined by claim 2, said vehicle including a body superposed over said truck frame, said other means being a pulley carried by said block, a cable passing over said pulley, an anchor on said truck frame for one end of said cable, a winding shaft in said body, said cable having its other end wound on and secured to said shaft and hand operated means to rotate said shaft.

5. In friction braking means for vehicle wheels, the combination comprising two separate sources of braking effort, brake shoes each adapted frictionally to engage a portion of an adjacent wheel, brake shoe actuating levers, means connecting each one of the brake shoes to one of said levers, means connecting one end of one of the levers to one end of the other lever, movable elements each adapted to be moved in one direction by one of said sources of braking effort, one of said levers being rotatably connected to each of said movable elements and movable thereby to effect frictional engagement between each brake shoe and the adjacent wheel, means limiting movement of each of the movable elements when the other movable element is actuated by one of the sources of braking effort, and means normally biasing the movable elements to the positions in which the movement of each is stopped during movement of the other.

6. In a vehicle, a truck frame, a wheel, brake shoes adapted to frictionally engage opposite sides of said wheel, first and second levers pivoted to said shoes, rods connecting one pair of ends of said levers, a brake operating power cylinder and piston rod, said piston rod being connected to the second end of the first lever, a block slidable on said frame and pivotally supporting the second end of said second lever, means to limit the movement of said block whereby the second end of the second lever becomes an anchor for brake application by the power cylinder and other means to move said block away from its limit position to apply the brake independently of said power cylinder.

MARTIN P. BLOMBERG.